United States Patent [19]
Timtner

[11] 3,930,382
[45] Jan. 6, 1976

[54] TORQUE LIMITING COUPLING

[75] Inventor: Karlheinz Timtner, Homburg, Germany

[73] Assignee: Ringspann Albrecht Maurer KG, Bad Homburg vor der Hobe, Germany

[22] Filed: Dec. 19, 1973

[21] Appl. No.: 426,086

[30] Foreign Application Priority Data
Dec. 29, 1972 Austria..........................11174/72

[52] U.S. Cl. .................................................. 64/29
[51] Int. Cl.² ....................................... F16D 7/06
[58] Field of Search .................................... 64/29

[56] References Cited
UNITED STATES PATENTS
| | | | |
|---|---|---|---|
| 1,518,634 | 12/1924 | Cason, Jr. ............................... | 64/29 |
| 1,840,682 | 1/1932 | Sheldrick et al. ....................... | 64/29 |
| 3,018,866 | 1/1962 | Elliott et al. ........................... | 64/29 X |
| 3,277,670 | 10/1966 | Bent........................................ | 64/29 |

FOREIGN PATENTS OR APPLICATIONS
| | | | |
|---|---|---|---|
| 1,211,874 | 12/1959 | Germany.................................. | 64/29 |
| 1,675,774 | 9/1969 | Germany.................................. | 64/29 |

*Primary Examiner*—Allan D. Herrmann
*Attorney, Agent, or Firm*—Webb, Burden, Robinson & Webb

[57] ABSTRACT

A safety coupling which provides positive torque transfer and which disengages above a disengagement torque. The safety coupling comprises two coupling halves which are engaged to restrict axial movement. Some rollers restricted by a first coupling half are urged into recesses in a stop face associated with a second coupling half by a biasing mechanism enabling positive transfer of torque. However, disengagement of the coupling halves is permitted by a relative axial movement of the rollers and the stop face when the bias is overcome, the rollers being free to roll on fixed axes.

10 Claims, 7 Drawing Figures

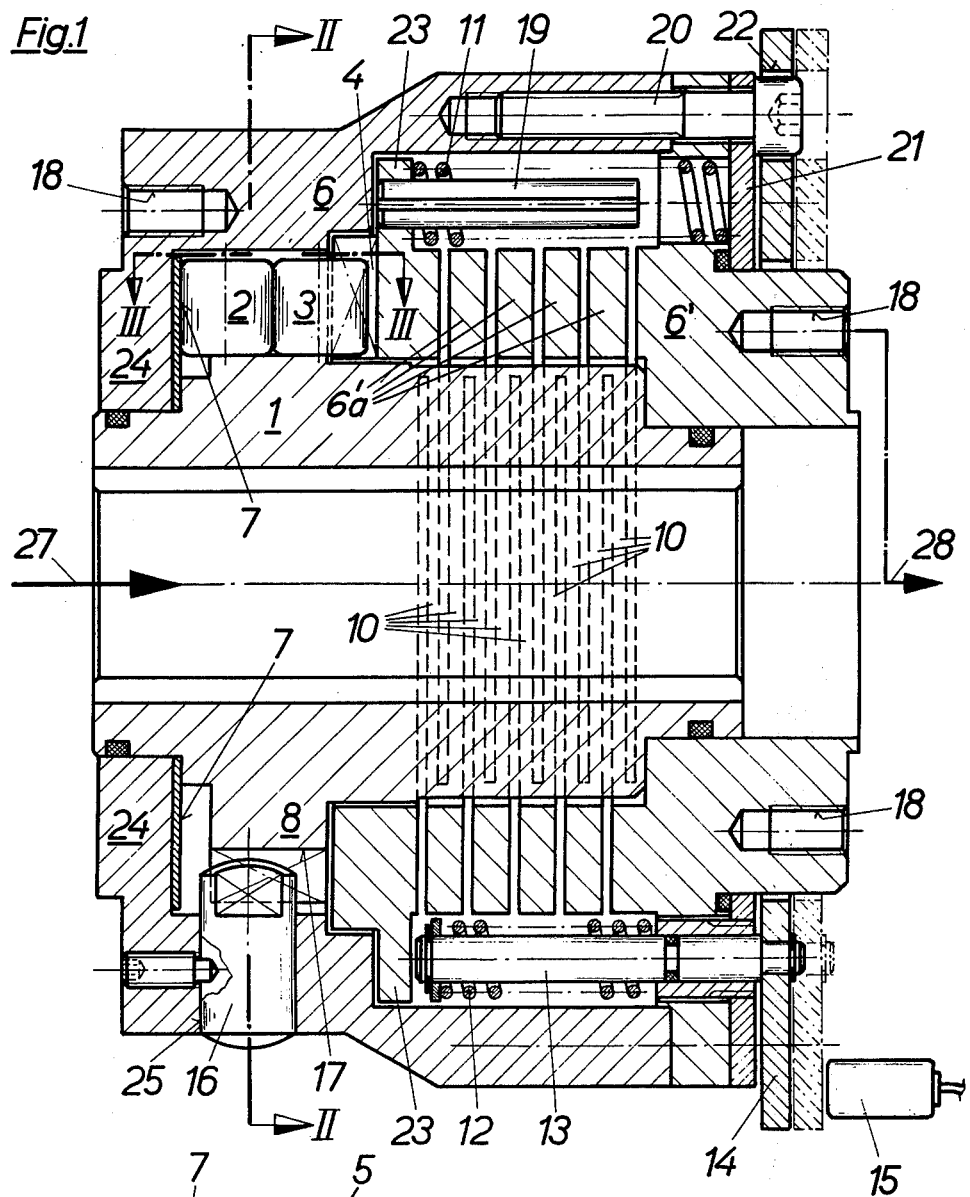
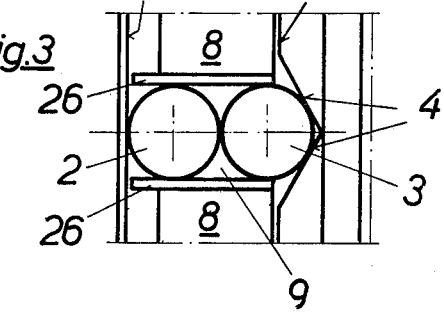

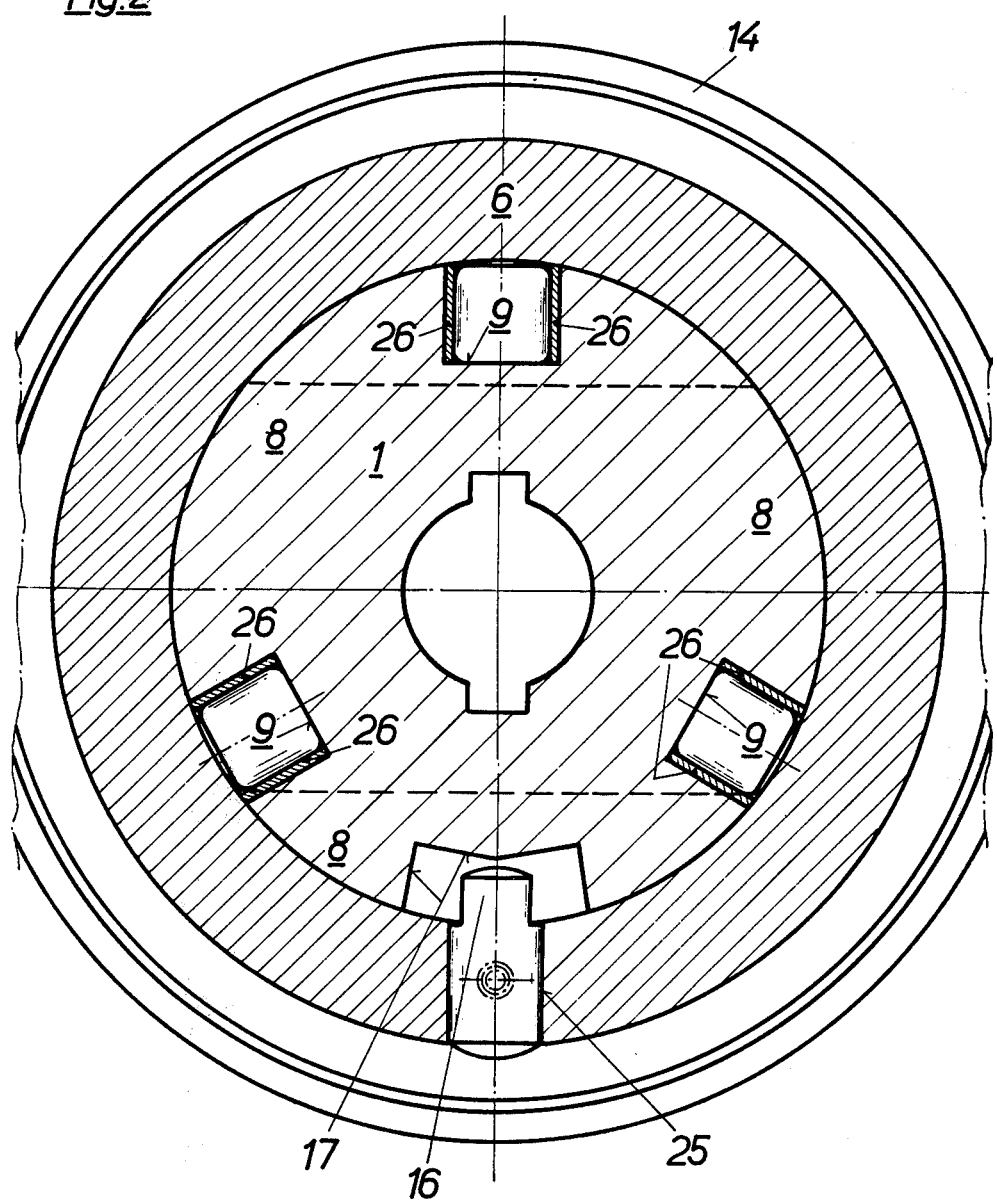

TORQUE LIMITING COUPLING

Most safety couplings rely on frictionally engaged clutch plates and the like secured to opposite sides of the coupling. The drawback of these couplings is that frictional forces are difficult to regulate and in time, these forces become variable. Some safety couplings have used rollers to transmit the torque from one side of the coupling to the other. However, they do not sufficiently eliminate the occurrence of frictional forces.

Safety couplings relying on frictional forces cannot be built to provide reproducible disengagement torque (response precision). Deviations ranging from 20 to 30% are unavoidable. However, a high degree of precision in the response of safety couplings is particularly necessary for present day machines which are presently designed with smaller margins of safety than formerly in order to hold down the prices.

Known safety couplings have an added drawback in that a prolonged service life degrades their performance. Frequent friction leads to wear and consequently the length of the reliable operation time is limited. When couplings of this type do not slide for an extended period of time, they will operate very unreliably. This can be attributed to environmental influences such as humidity, temperature, dirt and rust. In addition to the simple sliding friction, there exists static friction which occurs at the start of the shifting movement of two coupling halves relative to one another which adds to the unpredictability of the disengagement torque.

It is an advantage of the present invention to improve safety or torque limiting couplings and to provide a construction which can be economically manufactured and at the same time, avoid substantially all friction forces. It is a further advantage to provide an improved safety or torque limiting coupling that has a disengagement torque or response soley dependent upon the resilient properties of the materials used. Only the substantially complete elimination of frictional forces will allow the desired precision of adjustment and constancy of this precision over long periods of service.

Briefly, according to this invention, the coupling comprises two coupling halves engaged to restrict relative axial movement. The two halves are further engaged to prevent relative rotary movement, but to disengage at a disengagement torque. One half of the coupling comprises, in part, a coaxial disc having spaces therein to hold or restrict radially spaced rollers to prevent both axial and circumferential movement of the rollers and to allow the rollers to turn. This disc holds the rollers in such a way that the rollers extend away from at least one face of the disc. The other half of the coupling comprises, in part, a disc with a stop face having recesses therein for receiving some of the rollers projecting from the disc holding the rollers. Hence, the rollers keep the two discs keyed together without engaging face to face. Means associated with one half of the coupling bias the rollers and the stop face axially toward each other. At operating torques the rollers transmit torque from one half to the other. However, at or above disengagement torque, the rollers roll out of the recesses in the recessed face by overcoming the axial bias. The strength of the bias controls the disengagement torque and it is therefore substantially independent of frictional forces.

One coupling half may, for example, take the form of a hub with a flange thereon comprising an annular disc with at least three (3) recesses extending from the inner or the outer edge to accomodate one pair of rollers aligned in the direction of the coupling axis.

The biasing mechanism or spring mechanism may consist of a number of spaced annular discs that are aligned with one another and are connected with one another only by sectors. This spring mechanism consists of a circular cylindrical tube that has slits radially cut thereinto alternately from the one side and then from the other.

It is desirable to install supplemental springs between the spring mechanism and the associated coupling half. The supplemental spring increases the compressive force of the spring mechanism.

When the spring mechanism is compressed, its movement can be transmitted outward of the coupling to act upon a limit switch or an electronic proximity switch to shut off the rotating drive or source of the input torque. In this case, by means of a pin, the one coupling half may also be made to engage in a recess of larger dimensions in the other coupling half so that only limited relative rotation of the coupling half is possible.

The second coupling half may be constructed as a housing or sleeve encompassing the first coupling half constructed as a hub. The housing may be filled with grease or viscous oil which serves to dampen any vibrations created in the coupling.

In one preferred embodiment, the use of the roller pairs may be replaced by separating the pairs by a loose annular disc inserted therebetween on whose opposite side faces the rollers may ride.

According to one preferred embodiment, the rollers are rotably mounted about radially running axes on the outer cylindrical surface of the one coupling half and strike alternatingly against biasing the stop face and a fixed end face of the second coupling half.

Further features and other objects and advantages of this invention will become clear from the following detailed description made with reference to the drawings in which:

FIG. 1 is a longitudinal section of the coupling according to this invention.

FIG. 2 is a cross section taken along lines II—II of FIG. 1.

FIG. 3 is a side view of the partial section taken along lines III—III of FIG. 1.

Figure 4:
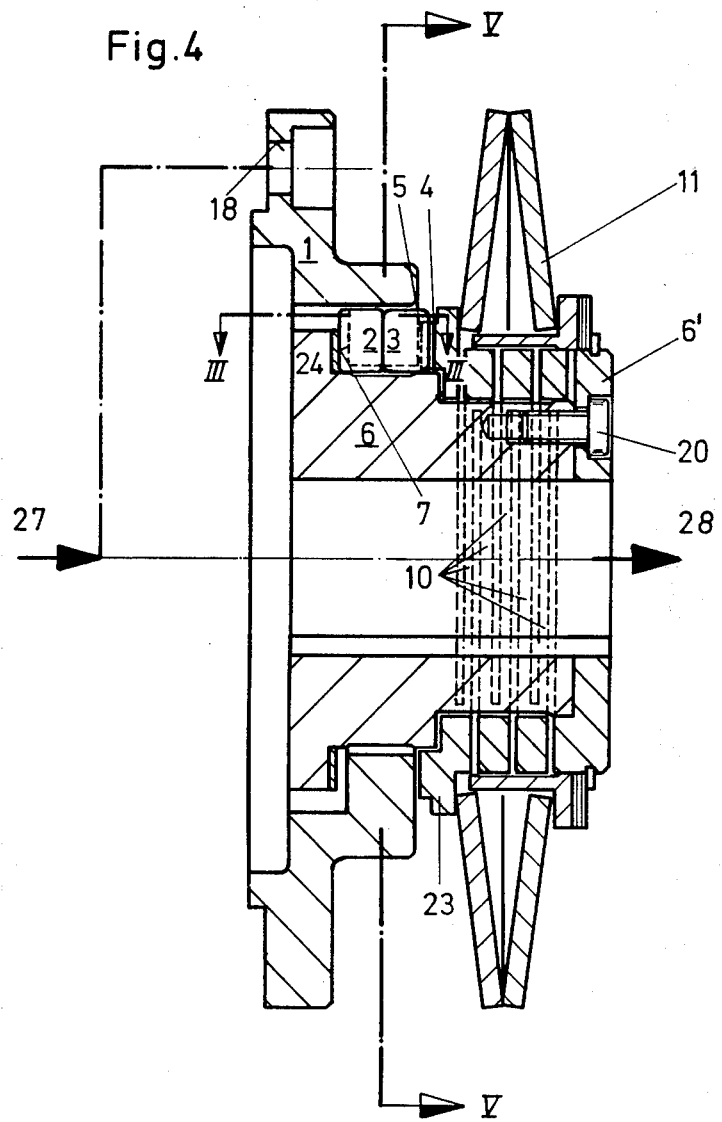
FIG. 4 is a longitudinal section of an additional preferred embodiment of the coupling according to this invention.

The coupling illustrated in FIGS. 1 and 2 consists essentially of the two coupling halves 1 and 6. The first coupling half is generally a hub with a coaxial disc thereon. The second coupling half is generally a sleeve or a housing coaxial with the hub and including an associated biasing mechanism 6'. Pairs of rollers 2, 3 held between the disc faces on each half of the coupling by the spring mechanism 6' transmit torque introduced for instance, in the direction indicated by arrow 27, so that it may be passed on in the direction indicated by arrow 28. It should be understood that according to this invention, torque may be transmitted in either axial direction and in either circumferential direction and the disengagement torque will be substantially the same in each instance.

In the illustrated embodiment, the first coupling half 1, is a hub having a flange 8 in the shape of an annular disc into which peripheral recesses 9 have been sunk at regular intervals. Aligned pairs of rollers 2, 3 are held in or restricted by the recesses. Peripheral recesses 9 are appropriately lined on both sides with small wear plates so that the latter will hold the roller pairs 2, 3 positively as shown in FIG. 3.

A roller pair 2, 3 is inserted between the planar stop face 7 of an inwardly facing collar 24 of housing-like coupling half 6 and an oppositely disposed stop face 5 of spring mechanism 6'. The right hand roller 3 engages in a suitably designed recess 4 in stop face 5. Preferably, the stop face 5 has radial grooves to receive the rollers. The grooves preferably have two inclined groove faces enabling the rollers to roll out of the groove in either circumferencial direction when the torque overcomes the axial bias as explained herein. Thus, roller pair 2, 3 is clamped in place by the second coupling half 6 from two opposing sides. The torque that is picked up from annular disc shaped flange 8 of coupling 1 is transmitted positively to the two stop faces 5, and 7. When the disengagement torque is exceeded, annular disc shaped flange 8 of coupling half 1 will be displaced in the circumferential direction relative to the stop faces 5 and 7 of the other half 6 whereby the pair of rollers 2, 3 will execute a rolling movement and substantially no frictional forces will occur at any point. When the torque limit is reached, spring mechanism 6' is compressed axially, since spring mechanism 6' is constructed such that it has flexibility only in the axial direction. In the peripheral direction, spring mechanism 6' is completely rigid and transmits the absorbed torque in a truely positive manner. (Other embodiments are envisioned wherein flange 23 is splined to the housing 6 to insure positive transfer of torque.)

Figure 6:
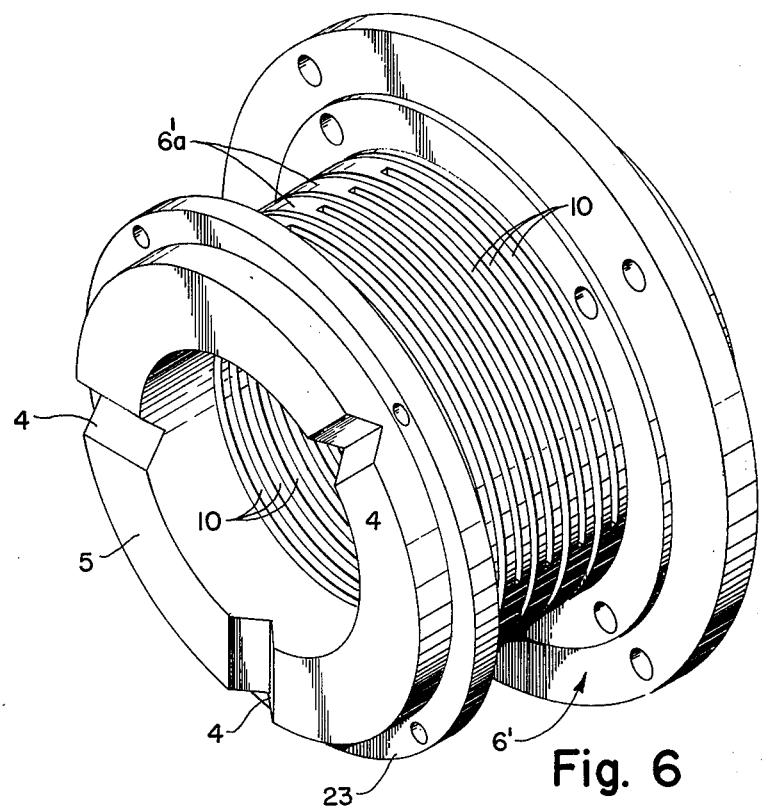
FIG. 6 is a perspective of the biasing mechanism 6' of FIG. 1.
Figure 7:
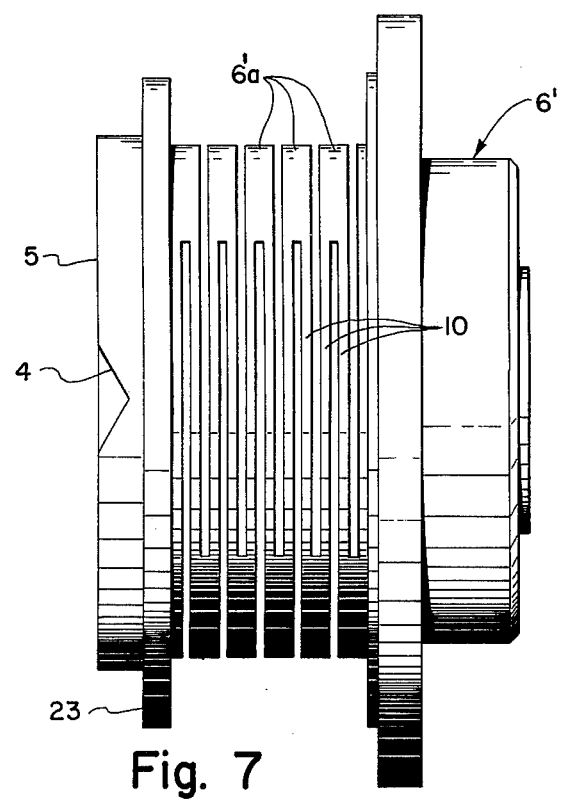
FIG. 7 is a side view of the biasing mechanism 6' of FIG. 1.

Preferably, according to this invention, the bias mechanism is provided with elasticity in the axial direction and rigidity in the peripheral or circumferencial direction by a design comprising perforated discs 10 which are aligned with one another and are connected to one another only by sectors 6'a. The above mentioned stop face 5 with its receiving recesses 4 is located at the left hand outer end of spring mechanism 6'. FIGS. 6 and 7 illustrate the spring or biasing mechanism 6' and illustrate how the mechanism comprises perforated discs 10 joined by sectors 6'a. At this end, there is also an outwardly directed flange 23 with supplemental springs 11 that are guided by adapter sleeves 19. The supplemental springs increase the pressure exerted by the spring mechanism 6'. The supplemental springs 11 depending upon the configuration, adjustability, and number will make it possible to vary the overall compressive force in the desired and required direction and to thereby adjust or pre-select the disengagement torque.

One end of springs 11 abut an annular disc 21 which is provided with a number of bores for receiving bolts 20. The bolts releasably connect housing-like coupling half 6 to spring mechanism 6', through the annular disc 21.

In coupling half 6 and its associated spring mechanism 6' bores 18 are provided which secure an input output device of any desired type for receiving the torque.

It is also possible to provide a sensing device which consists of a bolt 13 and an annular disc 14 which is subject to the pressure of helical springs 12. The sensing device is braced against the above-mentioned outwardly directed flange 23 of spring mechanism 6'. Annular disc 14 is suitably provided with a number of bores 22, to permit free passage therethrough of fastening bolts 20. If the torque limit is exceeded, collar 23 of spring mechanism 6' will move from left to right in the drawing and this compressive movement of spring mechanism 6' will be transmitted to the outside of the housing-like coupling by the above mentioned sensing device 13, 14 and can be properly registered by an electronic proximity switch 15. Desirably, the torque will be immediately shut off thus avoiding possible damage by exceeding the torque limit.

When the safety coupling, according to this invention is equipped with a shut off device as above-described, it may be desirable to equip the coupling with means for limiting the rotational movement of the two coupling halves relative to one another. It may for instance, be the purpose of such a device to prevent the rollers from rolling completely out of their grooves or cradles, so that when the overload is eliminated, the coupling will automatically be re-engaged. Such a device consists appropriately of a pin 16 which is mounted in a bore 25 in coupling half 6 and is engaged in a recess 17 of larger dimensions in the other coupling half. Without this device, the two coupling halves could turn freely creating great torsional vibration due to the repeated contraction and expansion of the biasing means creating a great amount of noise. The housing-like shape of coupling half 6 permits it to be filled with grease or viscous oil thereby dampening vibrations.

Figure 5:
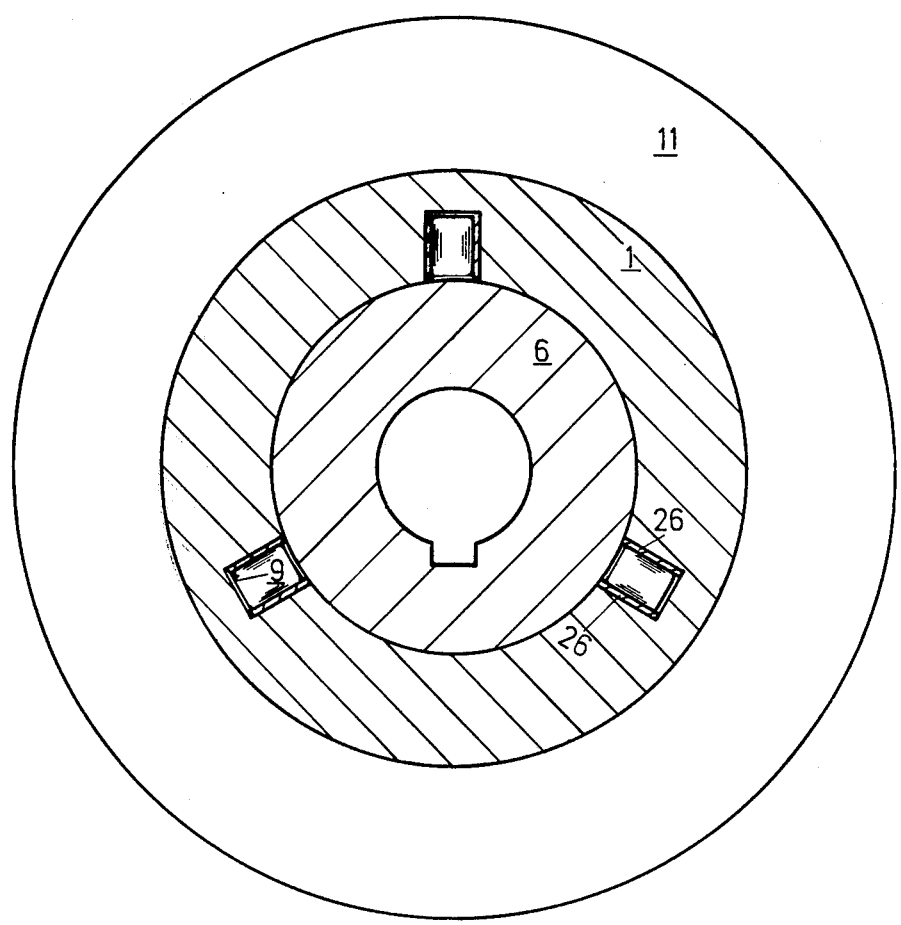
FIG. 5 is a cross section taken along lines V—V of FIG. 4.

Of course, it is understood that certain modifications can be made to the above-described coupling without departing from the scope of this invention. One such presently preferred modified structure is illustrated in FIGS. 4 and 5. The coupling consists essentially of two coupling halves 1 and 6 which engage one another to restrict axial movement. First coupling half 1 includes a coaxial annular disc having a plurality of spaced apart, peripheral recesses 9. Aligned pairs of rollers 2, 3 are held in or restricted by peripheral recesses 9 of the annular disc. Peripheral recesses 9 are appropriately lined on both sides with small wear plates 26 so that the latter will hold the roller pairs 2, 3 positively as shown in FIG. 5.

The second coupling half 6 is generally sleeve shaped and coaxially aligned with the first coupling half 1. Second coupling half 6 includes two opposed end faces fixed thereto and an outwardly extending peripheral collar 24 having a planar stop face 7 engaging roller pairs 2, 3. Spring biasing means 6', generally cup-shaped, is secured to second coupling half 6 by suitable bolts 20. Biasing means 6' includes perforated discs 10 similar to those shown in FIG. 1, and previously described above. Still referring to the embodiment of FIG. 4, biasing means 6' also includes moveable stop face 5 having roller engaging recesses 4. Roller pairs 2, 3 are thus clamped in place by planar stop face 7 and moveable stop face 5. Stop faces 5 and 7 rotate with second coupling half 6 along with roller pairs 2, 3 which turn on a fixed axis generally radial to the disc of first coupling half 1 and the coupling axis, designated generally by the arrows 27,28.

Planar stop face 7 is rigid in the axial direction while stop face 5 is axially moveable relative to second coupling half 6 due to the action of perforated discs 10 of biasing means 6'. Biasing means 6' forceably urges stop face 5 away from the right side end face of coupling 6 and toward left side end face flange 24 thereby forcing stop face 5 into engagement with rollers 3. The biasing force applied to rollers 3 is transmitted by rollers 3 to their adjacent rollers 2 and hence to planar stop face 7. The roller pairs 2, 3 are held in place by stop face 7 on one side and recesses 4 of stop face 5 on the other side. Torque is thus transferred between coupling halves 1 and 6 by the roller pairs 2, 3 mounted in peripheral recesses 9 of first coupling half 1. When a torque level greater than the biasing force is reached, the wear plates 20 in recesses 9 of first coupling half 1 forceably engage roller pairs 2, 3 causing the rollers 3 to forceably move stop face 5 in an axial direction away from the rollers permitting disengagement of the rollers with stop face recesses 4 thus allowing free rotation of first coupling half 1 independent of second coupling half 6.

The biasing means 6' of FIG. 4 also include supplemental spring elements 11 mounted around the outer periphery thereof. Springs 11 are two concave washer elements having their concave surfaces facing one another and their outer convex sides adjacent the bore, forceably bearing against biasing means 6' in the axial direction.

The advantages of the above-described safety or torque disengaging coupling are that the torque is transmitted positively using only the resilient properties of the materials employed. Since the torque is transmitted substantially without any friction, the coupling always reacts uniformly regardless of all surrounding conditions since the modulus of elasticity of the materials comprising the biasing means (for example steel) are not changed under these influences.

Even after a random number of overloads, the properties of the coupling are not affected, because no wear occurs due to the rolling movement and compression of the springs. Service life is extended because the coupling responds again and again to the torque limit. Moreover, with the aid of supplemental springs, it is possible to set the torque limit very sensitively. A further advantage of the coupling is that it responds independently of the rotational direction of the torque.

Having thus described my invention as required by the Patent Laws, what is desired protected by Letters Patent is set forth in the following claims:

1. A safety coupling which provides positive torque transfer and which disengages above a disengagement torque comprising first (1) and second (6) coupling halves which are engaged to restrict axial movement, said first coupling half having a disc shaped flange (8) defining at least three radial recesses (9), at least a pair of cylindrical rollers (2, 3) within the recesses in the first coupling half (1) such that they move with the first coupling half and are free to roll on axes generally radial to the coupling axis, said second coupling half (6) comprising first and second stop faces (5, 7) arranged on opposite sides of the disc shaped flange (8) of the first coupling half, said first stop face defining recesses (4) for receiving part of an adjacent roller and said second stop face (7) being planar and adjacent one of said remaining rollers, means integral with said first stop face for biasing it toward the second stop face, said biasing means being axially compressible and peripherally rigid, whereby said biasing means urges rollers held by said radial recesses (9) into the said stop face recesses (4) for transmitting torque between the coupling halves (1, 6) and permitting disengagement of the coupling halves by axial movement of the axially movable stop face.

2. A safety coupling according to claim 1 wherein said first coupling half comprises a hub, and said second coupling half comprises a sleeve coaxial with said hub thereby defining a housing.

3. A safety coupling according to claim 1 wherein the said biasing means (6') consists of a number of spaced annular discs (10) which are in alignment with one another and are connected to one another only by sectors.

4. A safety coupling according to claim 3 wherein the biasing means consists of a circular cylindrical tube having slits thereinto in the radial direction alternately from one side and then the other.

5. A safety coupling according to claim 1 wherein between the biasing means and its associated coupling half (6) supplemental springs (11) are provided which serve to increase the pressing force of the spring mechanism (6').

6. A safety coupling according to claim 1 wherein the movement produced by the compression of the biasing means is transmitted out of the coupling to a sensing device (13, 14) held under spring pressure (12) and which may act upon a limit switch or an electronic proximity switch (15) shutting off the means to apply torque to the coupling.

7. A safety coupling according to claim 6 wherein a pin (16) secured to one coupling half engages a recess (17) of greater dimension than the other coupling half so that only limited rotational movement of the two coupling halves relative to one another is permitted.

8. A safety coupling according to claim 1 wherein the second coupling half (6) defines a housing surrounding the first coupling half (1) and may be filled with grease or other viscous oil for dampening purposes.

9. A safety coupling according to claim 1 wherein rollers restrained by recesses in disc shaped flange (8) are separated from one another by a loose disc ring on both of whose opposed side faces the rollers may ride.

10. A safety coupling according to claim 1 wherein on the outer cylindrical convex surface of one coupling half, rollers are rotatably mounted about radially running axes, the said rollers alternately striking against the two end faces of the second coupling half, i.e. against its fixed end face and its biasing stop face.

* * * * *